US 6,692,849 B2

(12) United States Patent
Araki et al.

(10) Patent No.: US 6,692,849 B2
(45) Date of Patent: Feb. 17, 2004

(54) MAGNETIC RECORDING MEDIUM COMPRISING SPINDLE-SHAPED FERROMAGNETIC METAL PARTICLES (75) Inventors: Hiroaki Araki, Kanagawa (JP); Mikio Ohno, Kanagawa (JP); Toshichika Aoki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/956,036

(22) Filed: Sep. 20, 2001

(65) Prior Publication Data

US 2002/0064686 A1 May 30, 2002

(30) Foreign Application Priority Data

Sep. 20, 2000 (JP) ........................................ 2000-285589

(51) Int. Cl.$^7$ ................................. B32B 5/16
(52) U.S. Cl. ................. 428/694 BR; 141/143; 141/694 BH
(58) Field of Search ........................ 428/694 BH, 141, 428/143, 694 BR (56) References Cited

U.S. PATENT DOCUMENTS 4,664,734 A * 5/1987 Okita et al.
6,210,775 B1 * 4/2001 Ejiri et al.
6,291,052 B1 * 9/2001 Takahashi et al.
6,352,776 B1 * 3/2002 Hayashi et al.
6,432,503 B2 * 8/2002 Aonuma et al.

* cited by examiner

Primary Examiner—H. Thi Le
(74) Attorney, Agent, or Firm—Sughrue Mion, PLLC

(57) ABSTRACT

A magnetic recording medium is provided comprising a non-magnetic support and at least one magnetic layer comprising ferromagnetic metal particles principally containing iron, having a spindle shape and having an average major axis length of 0.15 μm or less, and a binder resin, and optionally further comprising, between the support and the magnetic layer, at least one adhesive layer or at least one non-magnetic layer principally containing a non-magnetic inorganic powder and a binder, and wherein center line average surface roughness Ra of the magnetic layer surface being 2 to 6 nm, said recording medium having the following properties; steel ball wear at 23° C. and 70% RH being $2 \times 10^{-5}$ to $4 \times 10^{-5}$ mm$^3$, surface C/Fe ratio measured by Auger electron spectroscopy being 50 to 100, and coefficient of friction between the magnetic layer surface and an SUS rod having a roughness of 8 to 10 nm being 0.2 to 0.3.

18 Claims, 1 Drawing Sheet

FIG.1

MAGNETIC RECORDING MEDIUM COMPRISING SPINDLE-SHAPED FERROMAGNETIC METAL PARTICLES

BACKGROUND OF THE INVENTION

1. Field of the Invention

The present invention relates to a magnetic recording medium and, more particularly, a coated type magnetic recording medium for broadcasting and computers where high reliability is required.

2. Description of the Related Art

Magnetic recording media have been widely used as sound recording tapes, video tapes, computer tapes, disks, etc. The density of magnetic recording media has been increasing year after year, and the recording wavelength has been shortening. Moreover, a wide range of recording systems including analogue systems to digital systems have been studied.

In particular, a magnetic recording medium in which ferromagnetic metal particles containing Fe as a main component are coated with a binder on a non-magnetic support currently dominates the field of media for broadcasting, video and data recording because of its excellent cost performance. Such magnetic recording media for broadcasting, video and data recording are required to have high electromagnetic conversion characteristics as well as high running durability that can withstand more severe use under a range of conditions than is the case with normal consumer use since recorded images and data are used as commercial products.

In recent years, in order to enhance the recording density the magnetic material used in the magnetic recording medium has been made into finer particles. In addition, since the packing ratio of the magnetic material has improved due to the invention of spindle-shaped fine metal particles having less branching of the particles, it becomes difficult to ensure the running durability due to the occurrence of clogging of the magnetic head (hereinafter, simply called the 'head' in some cases). In recent years in particular, diversity in the application environment has required a higher running durability than is available in the art. In some cases, the maintenance of a VTR is inadequate and it is therefore necessary to increase the allowance for the running durability. Furthermore, the costs for head replacement and head adjustment impose a great burden on the maintenance of VTRs. In comparison with the art, there is thus an increasing demand for a magnetic recording medium that can ensure a long life for the head, that is to say, causes less abrasion of the head.

The running durability includes stills, clogging, decrease in output, etc. In order to improve these properties, the amount of abrasive present on the surface of the magnetic layer has been controlled, as is already known in Japanese Patent Application Laid-open Nos. 61-57036, 64-88917 and 9-35251.

Japanese Patent Application Laid-open No. 61-57036 discloses a magnetic recording medium that improves the abrasivity toward a magnetic head by specifying that the number of abrasive particles per unit area of the surface of a magnetic layer is 0.25 particles/100 $\mu m^2$. Japanese Patent Application Laid-open No. 64-88917 discloses a magnetic recording medium that improves the abrasivity toward a magnetic head by specifying that the number of abrasive alumina particles per unit area of the surface of a magnetic layer is 0.25 to 0.60 particles/100 $\mu m^2$. Japanese Patent Application Laid-open No. 9-35251 discloses a magnetic recording medium that causes less head wear by setting the number of abrasive particles exposed by 0.3 $\mu m$ or more on the surface of a magnetic layer at 3.5 or less particles/100 $m^2$.

Various studies have thus been conducted into the amount of abrasive on the surface, but there is the fundamental problem that adjustment of the abrasivity by using an abrasive cannot simultaneously solve the problems of head wear and head clogging, which are mutually contradictory. That is to say, when the amount of abrasive on the surface is increased so as to enhance the abrasivity toward a magnetic head, although head clogging is suppressed, the head wear increases so shortening the life of the head. When the amount of abrasive on the surface is decreased, although the head wear decreases, the durability is degraded due to head clogging, an increase in dropouts during running, etc. Such problems including head clogging are serious problems in systems for, in particular, broadcasting and computers, and the high cost of head replacement is also a major problem.

As a result of an intensive investigation by the present inventors in order to simultaneously achieve the prevention of head wear and head clogging, which are mutually contradictory, the present invention has been accomplished.

BRIEF SUMMARY OF THE INVENTION

With regard to a magnetic recording medium comprising a non-magnetic support and at least one magnetic layer comprising ferromagnetic metal particles principally containing iron, having a spindle shape and having an average major axis length of 0.15 $\mu m$ or less and a binder resin, it is an object of the present invention to provide a magnetic recording medium causing less head wear and having excellent running durability in addition to satisfying the required electromagnetic conversion characteristics.

A first object of the present invention relates to a magnetic recording medium comprising a non-magnetic support and at least one magnetic layer comprising ferromagnetic metal particles principally containing iron, having a spindle shape and having an average major axis length of 0.15 $\mu m$ or less, and a binder resin, and optionally further comprising, between the support and the magnetic layer, at least one adhesive layer or at least one non-magnetic layer principally containing a non-magnetic inorganic powder and a binder, and wherein center line average surface roughness Ra of the magnetic layer surface is 2 to 6 nm, said recoding medium having the following properties:

- steel ball wear at 23° C. and 70% RH is $2 \times 10^{-5}$ to $4 \times 10^{-5}$ $mm^3$;
- surface C/Fe ratio measured by Auger electron spectroscopy is 50 to 100; and
- coefficient of friction between the magnetic layer surface and an SUS rod having a roughness of 8 to 10 nm is 0.2 to 0.3.

A second aspect of the present invention relates to a magnetic recording medium for use in a magnetic recording and playback drive of a middle cylinder rotary type comprising: a non-magnetic support; and at least one magnetic layer formed by coating ferromagnetic metal particles principally containing iron, having a spindle shape and having an average major axis length of 0.15 $\mu m$ or less, and a binder resin directly on the non-magnetic support or via at least one adhesive layer or at least one non-magnetic layer principally containing a non-magnetic inorganic powder and a binder; center line average surface roughness Ra of the magnetic layer surface being 2 to 6 nm; steel ball wear at 23° C. and 70% RH being $2\times10^{-5}$ to $4\times10^{-5}$ mm$^3$; surface C/Fe ratio measured by Auger electron spectroscopy being 50 to 100; and coefficient of friction between the magnetic layer surface and an SUS rod having a roughness of 8 to 10 nm being 0.2 to 0.3.

DETAILED DESCRIPTION OF THE INVENTION

The center line average surface roughness Ra of the magnetic layer is measured using a model HD-2000 optical interferometer type three dimensional roughness meter (manufactured by WYKO) with an object lens magnification of 50 times and an intermediate lens magnification of 0.5 times. The area measured is 242 μm×184 μm. In the present invention, the Ra of the surface of the magnetic layer of the present invention is 2 to 6 nm (this is the same as 'at least 2 nm and at most 6 nm'. This applies to the rest of the present invention.) When the Ra is larger than 6 nm, the spacing loss increases and the electromagnetic conversion characteristics, in particular in the short wavelength region, are easily degraded and the head wear increases. When the Ra is less than 2 nm, the coefficient of friction increases and the running in the drive easily becomes unstable.

Furthermore, the magnetic recording medium of the present invention has a steel ball wear of $2\times10^{-5}$ to $4\times10^{-5}$ mm$^3$ at 23° C. and 70% RH. The steel ball wear is defined as the amount of a steel ball having a diameter of 6 mm that is worn when the steel ball is moved to-and-fro so as to rub a fresh section on a magnetic tape having a length of 20 mm for a total of 20 times with a load of 20 g (0.196 N). The greater the steel ball wear, the greater the ability to remove dirt attached to a magnetic head making it resistant to problems such as head clogging. In order to obtain this effect, the steel ball wear of the magnetic recording medium of the present invention is set to at least $2\times10^{-5}$ mm$^3$ and at most $4\times10^{-5}$ mm$^3$. When the steel ball wear is large, in general, the head itself is easily worn. A steel ball wear of more than $2\times10^{-5}$ mm$^3$, which is the lower limit of the present invention, is considered to be too large in the art. However, it has been found by the present inventors that maintaining the surface C/Fe ratio, which will be described below, at an appropriate level can reduce the head wear while allowing the steel ball wear to be maintained at $2\times10^{-5}$ mm$^3$ or more (that is to say, maintaining the ability to clean dirt attached to the magnetic head). Furthermore, when the steel ball wear exceeds $4\times10^{-5}$ mm$^3$, even by appropriately maintaining the surface C/Fe ratio as measured by Auger electron spectroscopy not only the head wear but also the wear of transport system guides, etc. undesirably increase. The steel ball wear in the present invention is therefore set at $4\times10^{-5}$ mm$^3$ or less.

In the magnetic recording medium of the present invention, the surface C/Fe peak ratio as measured by Auger electron spectroscopy (hereinafter, simply called the 'surface C/Fe ratio') is from 50 to 100. The surface C/Fe ratio is a value obtained using a model PHI-660 (manufactured by PHI Co.) under conditions where the acceleration voltage of the primary electron beam is 3 KV, the sample current is 130 nA, the magnification is 250 times and the inclination angle is 30 degrees, measuring the kinetic energy region of 130 eV to 730 eV three times and obtaining the intensities of the KLL peak of the carbon and the LMM peak of the iron in the form of a derivative.

The surface C/Fe ratio denotes the ratio of organic substances to magnetic material on the surface of a magnetic layer. The organic substances may include binders, organic additives, solvents, etc. Auger electron spectroscopy is considered to detect elements in the magnetic layer up to about a few tens of Å from the surface, and components that have a low molecular weight and are difficult for a magnetic material to adsorb, such as, for example, fatty acid esters are mainly detected.

Normal magnetic recording media using ferromagnetic metal particles have a surface C/Fe ratio of 10 to 40. The present inventors have found that increasing the surface C/Fe ratio of a magnetic recording medium can reduce the head wear even when the steel ball wear level is unchanged, and the surface C/Fe ratio is controlled so as to be 50 to 100 in the present invention. It is surmised that the presence of organic substances on the surface of a magnetic recording medium has the effect of reducing the sliding resistance between the magnetic recording medium and a rotating cylinder, etc. rotating at a high speed, and the actual head wear can be suppressed while maintaining the ability of the medium itself to abrade, which can be represented by the steel ball wear.

The magnetic recording medium of the present invention can be used preferably as a magnetic recording tape.

There are several methods of controlling the surface C/Fe ratio of the magnetic recording medium of the present invention. Firstly, the surface C/Fe ratio can be controlled by changing the amount of a fatty acid ester added. Secondly, it can be controlled by the compatibility between the magnetic layer and the fatty acid ester. The compatibility depends on the types of magnetic layer and fatty acid ester, and the lower the compatibility the higher the C/Fe ratio even for the same amount of fatty acid ester added. Thirdly, it can be controlled by the drying conditions. The fatty acid ester migrates onto the tape surface during a drying step, and the C/Fe ratio can be increased by intensive drying. Fourthly, it can be controlled by controlling the structure of the coating. When there are a large number of pores on the surface of the coating, the C/Fe ratio increases. The C/Fe ratio can be controlled so as to be 50 to 100 by employing one or a combination of more than one of the above-mentioned methods, and the effect of the present invention can thus be exhibited.

When the C/Fe ratio is large, running at a low speed such as 'slow running' becomes unstable, and the tape easily adheres to a fixed head or a cylinder. As a result of analysis, the present inventors have found that this phenomenon easily occurs when the coefficient of friction between the tape and a flat guide when running at low speed is large, and reducing the coefficient of friction to 0.3 or less can stabilize the low speed running. The coefficient of friction is measured using an SUS rod (a tape guide made from stainless steel) having a surface roughness of 8 to 10 nm and a diameter of 5 mm, wrapping the magnetic surface of a tape around the SUS rod with a 180 degree wrap, hanging a weight having a mass of T1 from one end of the tape and moving the tape to-and-fro at a constant speed over a predetermined distance while detecting a load T2 at the other end of the tape, and is determined using the equation $\mu=1/\pi\cdot\ln(T2/T1)$ (measurement environment 23° C. and 70% RH).

In the present invention the coefficient of friction is 0.2 to 0.3 when T1 is 20 g, the speed is 3 mm/sec and the distance is 50 mm. It is undesirable for the coefficient of friction to be smaller than 0.2, since the tape becomes unevenly wound.

The magnetic recording medium of the present invention can be applied to recording and playback using various types of magnetic head. With regard to the magnetic head, a ring head is preferred; any one of a ferrite head, an alloy head and a composite type head can be used, and it is also possible to employ a single head or multiple heads. In general, with regard to magnetic recording and playback drives, there are a fixed head type and a rotary head type. The drive that can be used preferably with the magnetic recording medium of the present invention is of a rotary head type, that is to say, a type in which the head is mounted on a rotating cylinder and the magnetic recording medium is recorded or replayed using a track aligned in an oblique direction. In this case, either an upper cylinder rotary type or a middle cylinder rotary type can be used; the effect is particularly great for a middle cylinder rotary type drive, and the effect is large for a drive at a relative speed between tape heads of 7 m/sec or more and particularly great for a drive at 14 m/sec or more.

Figure 1:
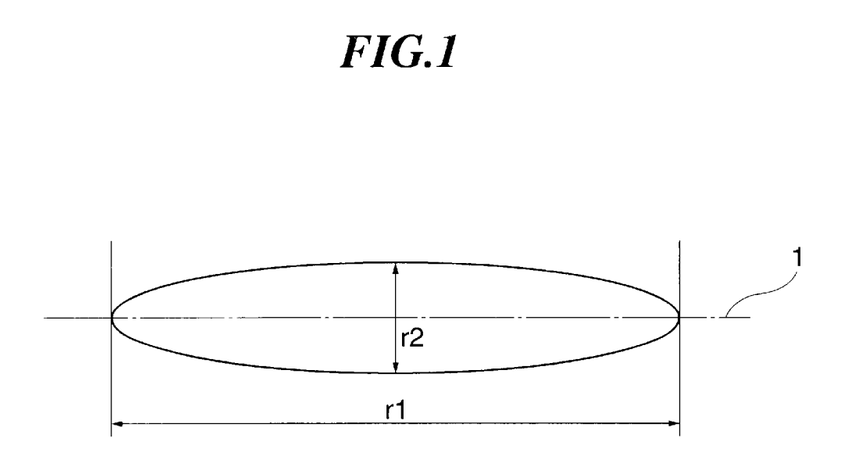
FIG. 1 is a schematic diagram showing the form of a spindle shaped ferromagnetic metal particle used in the magnetic recording medium of the present invention.

The magnetic recording and playback drive of the rotary head type is a head drum device having a surface over which a magnetic tape slides; the upper cylinder rotary type has a first fixed drum and a rotary drum on which a rotating magnetic head is mounted, whereas the middle cylinder rotary type has a first fixed drum, a middle rotary drum on which a rotating magnetic head is mounted and a second drum that is fixed or can rotate independently of the magnetic head. The middle cylinder rotary type magnetic recording and playback drive is known in, for example, Japanese Patent Application Laid-open No. 11-185229 and the head drum device shown in FIG. 1 or FIG. 7 therein can be used as one mode for carrying out recording and playback using the magnetic recording medium of the present invention.

Main preferred modes for carrying out the present invention are explained below.

The magnetic recording medium of the present invention is preferable wherein the average major axis length of the ferromagnetic metal particles contained in the magnetic layer is in the range from 0.05 to 0.15 $\mu$m.

The magnetic recording medium of the present invention is also preferable wherein the average major axis length of the ferromagnetic metal particles contained in the magnetic layer is in the range from 0.05 to 0.12 $\mu$m.

In the magnetic recording medium of the present invention the specific surface area of the ferromagnetic metal particles contained in the magnetic layer is preferable in the range from 40 to 60 m$^2$/g.

In the magnetic recording medium of the present invention it is preferable for the ferromagnetic metal particles contained in the magnetic layer principally to contain Fe and to include at least Al and Co in the content of Al/(Fe+Co)=5 to 15 atom % and Co/Fe=1 to 25 atom %.

In the magnetic recording medium of the present invention the preferable crystalline size of the ferromagnetic metal particles is 13 to 18 nm.

In the magnetic recording medium of the present invention the binder resin preferably comprises a vinyl chloride based resin, a polyurethane and a polyisocyanate. In the present invention more preferable is the magnetic recording medium wherein the vinyl chloride based resin is 5 to 20 wt %, the polyurethane resin is 2 to 15 wt %, the polyisocyanate is 2 to 20 wt %, and the total amount of the binder resin is 10 to 30 wt % relative to the ferromagnetic particles.

In the magnetic recording medium of the present invention the magnetic layer preferably contains an abrasive having a Mohs hardness of at least 6. A preferable abrasive is $\alpha$-alumina having an $\alpha$ component proportion of at least 90%. The abrasive has preferably an average particle size of 0.01 to 20.0 $\mu$m.

In the present invention preferable is the magnetic recording medium wherein the thickness of the non-magnetic support is 1 to 100 $\mu$m, the thickness of the magnetic layer is 0.1 to 5 $\mu$m, and the thickness of a backcoat layer is 0.1 to 2 $\mu$m. More preferable is the magnetic recording medium wherein the thickness of the non-magnetic support is 4 to 12 $\mu$m, the thickness of the magnetic layer is 0.1 to 3 $\mu$m, and the thickness of a backcoat layer is 0.4 to 1 $\mu$m.

In the magnetic recording medium of the present invention a non-magnetic layer mainly containing a non-magnetic inorganic powder and a binder is preferably provided between the non-magnetic support and the magnetic layer. The thickness of the non-magnetic layer is preferably 0.1 to 4 $\mu$m. The thickness of the non-magnetic layer is more preferably 0.4 to 2.5 $\mu$m.

Other preferred embodiments of the magnetic recording medium of the present invention will be explained below.

As for a production method for ferromagnetic metal particles principally containing iron (Fe), several methods are known. A method in which an iron oxide or a hydrated iron oxide prepared by a wet type reaction is heated and reduced in a reducing gas is used industrially. The ferromagnetic metal particles principally containing iron (Fe) of the present invention can thus be produced by an industrial method.

The ferromagnetic metal particles are preferably subjected to a slow oxidation treatment in order to form an oxide film on the surface thereof. With regard to the slow oxidation treatment, there are, for example, a method in which the powder is immersed in an organic solvent and then dried, a method in which the powder is immersed in an organic solvent, an oxygen-containing gas is introduced so as to form an oxide film and the powder is then dried, and a method in which an oxide film is formed on the surface of the powder by adjusting the partial pressures of oxygen gas and an inert gas without using any organic solvent. The method involving a gas-phase reaction is preferred because a uniform oxide film can be formed and the magnetic characteristics when stored under high temperature and high humidity are little changed.

With regard to the shape of the ferromagnetic metal particles, there are an acicular shape, a spindle shape, a sphere shape, a cubic shape, a plate shape, etc. The magnetic recording medium of the present invention employs spindle shaped ferromagnetic metal particles, which are most preferred among the above shapes. The spindle shape referred to here means a shape in which, in a cross section in a plane containing the major axis (length r1) of a particle, the width, which is the length in the direction perpendicular to the major axis, has a maximum value (r2) in the middle of the major axis and gradually decreases toward the two ends and becomes zero at the ends. The axis ratio (r1/r2) is preferably in the range from 5 to 10. The shape of the spindle shaped ferromagnetic metal particle is shown schematically in FIG. 1.

The reason why spindle shaped ferromagnetic metal particles are preferred is that the particles have a good particle size distribution and less branching and are uniform. The dispersibility and the orientation properties can thus be improved. In addition, the spindle-shaped particles are easily made into a coating solution since they have few voids.

The ferromagnetic metal particles used in the magnetic recording medium of the present invention preferably have a mean major axis length of 0.05 to 0.15 μm, and more preferably 0.05 to 0.12 μm. If the mean major axis length is 0.15 μm or less, there are relatively few entanglements between the magnetic particles, a good dispersion can be obtained, the surface roughness is low and excellent electromagnetic characteristics can be obtained. In addition, the phenomenon of the electromagnetic conversion characteristics not being easily obtained in the range where the recording wavelength is about 0.7 μm or less due to an axial length effect (length loss) hardly occurs. On the other hand, if the mean major axis length is less than 0.05 μm, the magnetic particles are too small and the durability is thus degraded in some cases.

The ferromagnetic metal particles used in the magnetic recording medium of the present invention preferably have a specific surface area of 40 to 60 $m^2/g$. When the specific surface area is 60 $m^2/g$ or less, the number of voids in the metal powder is not large which results in it being easy to make the metal powder into a coating solution since the viscosity does not increase during preparation. When the specific surface area is 40 $m^2/g$ or higher, the particles do not become excessively large and it becomes easy to obtain particles having a mean major axis length of 0.15 μm or less.

The crystallite size of the ferromagnetic metal particles used in the magnetic recording medium of the present invention is usually approximately 12 to 22 nm, and preferably 13 to 18 nm. The saturation magnetization (σs) is usually approximately 100 to 180 $A.m^2/kg$, and preferably 120 to 160 $A.m^2/kg$. The pH is preferably optimized by means of combination with a binder that is used. It is 4 to 12, and preferably 7 to 11.

The ferromagnetic metal particles of the present invention preferably contain 0.1 to 2.0 wt % of water. Ferromagnetic metal particles containing moisture can be obtained by contacting the ferromagnetic metal particles with water or a gas containing water vapor.

The ferromagnetic metal particles used in the magnetic recording medium of the present invention preferably contain as small an amount of impurities as possible. In particular, it is preferred that the content of water-soluble Na is 0 to 10 ppm/1 g and the content of water-soluble Ca is 0 to 10 ppm/1 g. These readily associate with organic material present in the magnetic tape so forming a metal soap, etc. during storage, which is precipitated on the surface of the tape thus causing an adverse influence on the running performance.

The contents of water-soluble Na and Ca present in the ferromagnetic metal particles are the values obtained by stirring 5 g of the ferromagnetic metal particles in 100 ml of distilled water at room temperature for 1 hour so as to perform an extraction, and subjecting the filtrate from the supernatant liquid to measurement using atomic absorption spectroscopy for Na and ICP for Ca.

The ferromagnetic metal particles used in the present invention principally contain Fe and can contain any other element if necessary. For example, Al, Co, Si, S, Ca, Ti, V, Cr, Cu, Mo, Rh, Pd, Ag, Sn, Sb, Te, Ba, Ta, W, Re, Au, Hg, Pb, Bi, P, Mn, Zn, Ni, Sr, B, Y, La, Nd, Sm, Gd, etc. can be cited. With regard to Al, Ni and Co, the total amount of Ni and Co added is preferably at most 50 atom % (relative to Fe), and more preferably 1 to 40 atom %. The amount of an element other than Ni and Co added is preferably 1 to 30 atom % (relative to Fe+Ni+Co), and more preferably 5 to 20 atom %.

Particularly preferred ferromagnetic metal particles used in the magnetic recording medium of the present invention principally contain Fe and at least Al and Co, wherein Al/(Fe+Co)=5 to 15 atom % and Co/Fe=1 to 25 atom %. Furthermore, the ferromagnetic metal particles used in the present invention contain no Si or Nd, or if they are present the content of each is preferably at most 0.1 atom % relative to Fe.

The ferromagnetic metal particles having the above-mentioned composition have surface characteristics controlled so as to maintain good adsorption of a binder. That is to say, the above-mentioned composition can ensure that a binder is strongly adsorbed on the ferromagnetic metal particles and the mechanical strength of a magnetic coating is high. As a result, it is possible to prevent the magnetic layer itself from being removed, etc. when sliding across a head at high speed. Furthermore, the amount of binder adsorbed on the ferromagnetic metal particles can be increased thus reducing the amount of binder that is not adsorbed on the ferromagnetic metal particles in the coating. It is surmised that, since the binder that is not adsorbed on the magnetic powder easily migrates to the surface of the magnetic layer in a drying step, problems such as head clogging, which is caused when the surface comes into sliding contact with a head, can be suppressed by reducing the amount of such a binder.

Among the above-mentioned elements contained in the ferromagnetic metal particles, it is believed that Al is present relatively close to the surface of the ferromagnetic metal particles. Al therefore strongly influences the adsorption characteristics of the binder on the ferromagnetic metal particles and, further, controls the hardness of the ferromagnetic metal particles. When the ratio of Al/(Fe+Co) increases, the binding force between the ferromagnetic metal particles and the binder becomes large, but if the ratio exceeds 15 atom % the ferromagnetic metal particles themselves become excessively hard so increasing head wear. In addition, if the ratio of Al/(Fe+Co) is less than 5 atom %, the binding force between the ferromagnetic metal particles and the binder becomes small and head clogging easily occurs. The ratio of Al/(Fe+Co) is preferably 7 to 13 atom %.

If Si is present with Al or instead of Al in the ferromagnetic metal particles, head contamination during running after storage at high temperature and high humidity is greatly accelerated. Since $SiO_2$ and a mixed oxide of $SiO_2$ and $Al_2O_3$ are known as solid acid catalysts, it is surmised that the presence of Si in the ferromagnetic metal particles promotes the hydrolysis of organic material used in the magnetic recording medium together with the ferromagnetic metal particles. Therefore, the ferromagnetic metal particles used in the present invention do not contain Si or, if it is present, the Si content is 0.1 atom % or less relative to Fe. Preferably, ferromagnetic metal particles containing no Si are used.

Furthermore, it has been found that if Nd is contained in the ferromagnetic metal particles with Y or instead of Y, head contamination during running after storage at high temperature and high humidity is greatly accelerated. It is surmised that this is due to a difference between Y and Nd in the chemical action caused by a difference in the outer shell electrons, but the detailed cause is unknown. The ferromagnetic metal particles used in the present invention therefore contain no Nd or, if it is present, the Nd content is 0.1 atom % or less relative to Fe. Preferably, ferromagnetic metal particles containing no Nd are used.

The ferromagnetic metal particles used in the magnetic recording medium of the present invention can be subjected beforehand to a treatment with a dispersant, a lubricant, a surfactant, an antistatic agent, etc., which will be described below. Details are described in Japanese Patent Publication Nos. 44-14090, 45-18372, 47-22062, 47-22513, 46-28466, 46-38755, 47-4286, 47-12422, 47-17284, 47-18509, 47-18573, 39-10307, 48-39639, U.S. Pat. Nos. 3,026,215, 3,031,341, 3,100,194, 3,242,005, and 3,389,014, etc.

As for the binder used in the magnetic recording medium of the present invention, conventionally known thermoplastic resins, thermosetting resins, reactive type resins and mixtures thereof are used. With regard to the thermoplastic resins, those having a glass transition temperature of about 20 to 90° C., a number average molecular weight of 1,000 to 200,000, and preferably 10,000 to 100,000, and a degree of polymerization of about 50 to 1,000 can be cited. Examples of such binders include polymers or copolymers containing, as a monomer unit, vinyl chloride, vinyl acetate, vinyl alcohol, maleic acid, acrylic acid, acrylate esters, vinylidene chloride, acrylonitrile, methacrylic acid, methacrylate esters, styrene, butadiene, ethylene, vinyl butyral, vinyl acetal, vinyl ethers, etc., polyurethane resins and various rubber-based resins. In addition, with regard to examples of thermosetting resins and reactive type resins, phenol resins, epoxy resins, polyurethane thermosetting type resins, urea resins, melamine resins, alkyd resins, acrylic-based reactive resins, formaldehyde resins, silicone resins, epoxy-polyamide resins, a mixture of a polyester resin and an isocyanate pre-polymer, a mixture of a polyester polyol and a polyisocyanate, a mixture of a polyurethane and a polyisocyanate, etc. can be cited. Details of these resins are given in the "Plastic Handbook", published by Asakura Publishing. Moreover, known electron radiation curing resins can be used.

Examples of the above-mentioned binders and methods for their production are described in detail in Japanese Patent Application Laid-open No. 62-256219. The resins mentioned above can be used singly or in combination. As preferred resins, a combination of a polyurethane resin and at least one type of resin selected from vinyl chloride resins, vinyl chloride-vinyl acetate resins, vinyl chloride-vinyl acetate-vinyl alcohol resins, vinyl chloride-vinyl acetate-maleic anhydride copolymers, or a further combination with a polyisocyanate can be cited. As the structure of the polyurethane resin, known structures such as polyester-polyurethane, polyether-polyurethane, polyether-polyester-polyurethane, polycarbonate-polyurethane, polyester-polycarbonate-polyurethane, polycaprolactone-polyurethane and polyolefin-polyurethane can be used. With regard to all the binders mentioned above, in order to yet further improve the dispersibility and durability, if necessary, it is preferred to incorporate at least one group selected from —COOM, —SO$_3$M, —OSO$_3$M, —P=O(OM')$_2$, —O—P=O(OM')$_2$ (where M denotes hydrogen or an alkali metal atom and M' denotes hydrogen, an alkali metal atom or a lower hydrocarbon group), —OH, —NR$_2$, —N$^+$R$_3$ (where R denotes a hydrocarbon group having 1 to 12 carbons), an epoxy group, —SH, —CN, sulfobetaine, carboxybetaine, phosphobetaine, etc., and preferably at least one group selected from —COOM, —SO$_3$M, —OSO$_3$M and —P=O(OM')$_2$ into at least one of a polyurethane resin and a vinyl chloride based resin by copolymerization or an addition reaction. The amount of such a polar group is $10^{-8}$ to $10^{-1}$ mole/g, preferably $10^{-6}$ to $10^{-2}$ mole/g, and more preferably $3 \times 10^{-5}$ to $20 \times 10^{-5}$ mole/g Specific examples of these binders used in the present invention include VAGH, VYHH, VMCH, VAGF, VAGD, VROH, VYES, VYNC, VMCC, XYHL, XYSG, PKHH, PKHJ, PKHC and PKFE manufactured by Union Carbide Corporation, MPR-TA, MPR-TA5, MPR-TAL, MPR-TSN, MPR-TMF, MPR-TS, MPR-TM and MPR-TAO manufactured by Nisshin Kagaku Kogyo K.K., 1000W, DX80, DX81, DX82, DX83 and 100FD manufactured by Denki Kagaku Kogyo K.K., MR-104, MR-105, MR-110, MR-100 and 400X-110A manufactured by Nippon Zeon Co., Ltd., Nippollan N2301, N2302 and N2304 manufactured by Nippon Polyurethane Co., Ltd., Pandex T-5105, T-R3080 and T-5201, Burnock D-400 and D-210-80 and Crisvon 6109 and 7209 manufactured by Dainippon Ink and Chemicals, Inc., Vylon UR-8200, UR-8300, UR-8600, UR-5500, UR-4300, RV-530, RV-280 and FB-84 manufactured by Toyobo Co., Ltd., Daipheramine 4020, 5020, 5100, 5300, 9020, 9022 and 7020 manufactured by Dainichiseika Color & Chemicals Mfg. Co., Ltd., MX 5004 manufactured by Mitsubishi Chemical Corp., Sunprene SP-150, TIM-3003 and TIM-3005 manufactured by Sanyo Chemical Industries Co., Ltd., Saran F310 and F210 manufactured by Asahi Chemical Industry Co., Ltd., etc. Among those above, MR-104 and MR-110 are preferred.

With regard to the polyisocyanates used in the present invention, isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reaction between these isocyanates and polyalcohols, and polyisocyanates produced by the condensation of isocyanates can be used. These polyisocyanates are commercially available under the following trade names: Coronate L, Coronate HL, Coronate 2030, Coronate 2031, Coronate 3041, Millionate MR and Millionate MTL manufactured by Nippon Polyurethane Industry Co., Ltd., Takenate D-102, Takenate D-110N, Takenate D-200 and Takenate D-202 manufactured by Takeda Chemical Industries Co., Ltd., Desmodur L, Desmodur IL, Desmodur N and Desmodur HL manufactured by Sumitomo Bayer Co. Ltd., etc. They can be used singly or in a combination of two or more than two.

The most preferred polyurethane in the present invention is a polyurethane having as main components a diol component consisting of a polyether polyol and a polyester polyol and a polyisocyanate component (hereinafter, called 'preferred polyurethane').

With regard to the structure of the polyether polyol of the preferred polyurethane, those having, as a basic component, PPG (polypropylene glycol), PTMG (polytetramethylene glycol), PEG (polyethylene glycol), BPA (bisphenol A) adduct with PO (propylene oxide) and/or EO (ethylene oxide) and a mixture thereof can be cited. PPG and PTMG are particularly preferred.

The Tg of the polyether polyol is 0° C. or less, and preferably −10 to −60° C. The molecular weight thereof is usually 400 to 10,000, preferably 500 to 5,000, and more preferably 800 to 3,000. The proportion of the polyether polyol in the polyurethane is usually 3 to 80 wt %, preferably 5 to 70 wt %, and more preferably 10 to 50 wt %. When this proportion is too small, the effect becomes small. When it is too large, the mechanical strength is degraded and the durability becomes poor.

With regard to the structure of the polyester polyol of the preferred polyurethane, those containing a monomer having a cyclic structure (aromatic, aliphatic) and having a branched structure are preferred. With regard to the acid components, isophthalic acid (IPA), terephthalic acid, etc. can be cited. With regard to the alcohol components, neopentyl glycol (NPG), cyclohexanedimethanol (CHM), cyclohexanediol, bisphenol A, hydrogenated bisphenol A, etc. are preferred. The molecular weight of the polyester polyol is usually 400 to 10,000, preferably 500 to 5,000, and more preferably 800 to 3,000.

The preferred polyurethane has at least two Tgs. One thereof is usually from −250° C. to 0° C., and preferably −200° C. to 10° C. Another thereof is usually from 40 to 130° C., and preferably 45° C. to 110° C. When it has two Tgs, the lower one (low Tg) is preferably −5° C. or less, and more preferably −10° C. to −40° C. The higher one (high Tg) is preferably 50° C. to 120° C., and more preferably 60 to 100° C. A polyurethane having at least three Tgs can be prepared using either two different types of polyester polyol component and one type of polyether polyol component or one type of polyester polyol component and two types of polyether polyol component. One having at least four Tgs can also be prepared in the same manner as above. The Tg of the polyurethane is the E" peak temperature of a film having a thickness of 20 μm measured using a Vibron (Orientech).

Such a preferred polyurethane can also have a low molecular weight polyol component such as a known chain propagating agent in addition to the above-mentioned diol component. Specifically, a polyurethane having a branched structure can be formed using a combination of a diol such as NPG, ethylene glycol (EG), 1,4-butanediol (BD) or the dihydroxyethyl ether of bisphenol A and a tri- or higher-functional alcohol such as trimethylolpropane. These components can be added at 0 to 40 wt % relative to the polyurethane.

With regard to the polyisocyanate components used for the preferred polyurethane, aromatic and aliphatic diisocyanates such as tolylene diisocyanate (TDI), 4,4'-diphenylmethane diisocyanate (MDI), isophorone diisocyanate (IPDI) and hydrogenated MDI are preferred.

The binders used in the magnetic layer of the present invention are used in an amount of 10 to 30 wt %, and preferably from 15 to 25 wt % relative to the ferromagnetic metal particles. In particular, a combination of a vinyl chloride based resin, a polyurethane and a polyisocyanate is preferably used. When these three components are jointly used, the vinyl chloride based resin is used in an amount of 5 to 20 wt %, and preferably 7 to 15 wt %, the polyurethane resin is used in an amount of 2 to 15 wt %, and preferably 4 to 10 wt % and the polyisocyanate is used in an amount of 2 to 20 wt %, and preferably 3 to 10 wt %. The total amount of the three components is 10 to 30 wt %, and preferably 15 to 25 wt %. A strong magnetic layer can thereby be obtained by dispersing ferromagnetic metal particles well in a vinyl chloride based resin, introducing flexibility to the magnetic layer by means of a polyurethane and cross-linking the magnetic layer with a polyisocyanate.

To the magnetic layer of the present invention can be added powders such as carbon black and an abrasive. As for the carbon black used in the present invention, furnace for rubber, thermal for rubber, black for coloring, acetylene black, etc. can be used. Preferably, the specific surface area is 5 to 500 m$^2$/g, the DBP oil absorption is 10 to 400 ml/100 g, the particle size is 5 to 300 nm, the pH is 2 to 10, the moisture content is 0.1 to 10% and the tap density is 0.1 to 1.0 g/cc. Specific examples of the carbon black used in the present invention include Black Pearls 2000, 1300, 1000, 900, 800, 700 and Vulcan XC-72 manufactured by Cabot Corporation, #80, #60 #55, #50 and #35 manufactured by Asahi Carbon Co. Ltd., #2400B, #2300, #5, #900, #950, #970, #1000, #30, #40 and #10 B manufactured by Mitsub-ishi Chemical Corp., Conductex SC, Raven 150, 50, 40 and 15 manufactured by Columbia Carbon Co. Ltd., etc. These carbon blacks can be subjected to a surface treatment with a dispersant, etc., a grafting treatment with a resin, and a partial surface graphitization. Furthermore, the carbon black can be dispersed in advance in the binder before being added to a magnetic coating solution. These carbon blacks can be used singly or in combination. In the case where carbon black is used, it is preferable to use it in an amount of 0.1 to 30% relative to the amount of ferromagnetic metal particles. The carbon black has the functions of preventing static buildup in the magnetic layer, reducing the coefficient of friction thereof, introducing light-shielding properties thereto and improving the strength of the coating thereof. These effects depend on the type of carbon black. It is therefore possible in the present invention to use different types of carbon black in different amounts and combinations according to an intended purpose in terms of various characteristics such as particle size, amount of oil absorption, electrical conductivity and pH. The carbon black that can be used in the magnetic layer of the present invention can be chosen by reference to, for example, the 'Carbon Black Binran' (Carbon Black Handbook) edited by the Carbon Black Association.

With regard to the abrasive used in the present invention, known materials having a Mohs' hardness of at least 6 such as α-alumina having an αratio of at least 90%, γ-alumina, silicon carbide, chromium oxide, cerium oxide, α-iron oxide, corundum, artificial diamond, silicon nitride, silicon carbide, titanium carbide, titanium oxide, silicon dioxide and boron nitride can mainly be used singly or in combination. Composites of these abrasives (obtained by surface-treating one abrasive with another abrasive) can also be used. These abrasives contain a compound or an element other than the main component in some cases, but the intended effect can be obtained as long as the content of the main component is at least 90%. These abrasives preferably have an average particle size of approximately 0.01 to 2.0 μm, but the same effect can be achieved by combining a plurality of abrasives having different particle sizes from each other if necessary, or broadening the particle size distribution of a single abrasive. The tap density of the abrasive is preferably 0.3 to 2 g/cc, the water content thereof is 0.1 to 5.0%, the pH thereof is 2 to 11, and the specific surface area thereof is 1 to 30 m$^2$/g.

The shape of the abrasive used in the present invention can be any of acicular, spherical and cubic, and for high abrasivity is preferably a shape having an edge. With regard to specific examples of the abrasive used in the present invention, AKP-20, AKP-30, AKP-50, HIT-50, HIT-60, HIT-60A, HIT-70A, HIT-80, HIT-80G, HIT-100 (manufactured by Sumitomo Chemical Co., Ltd.), G-5, G-7 and S-1 (manufactured by Nippon Chemical Industrial Co., Ltd.), TF-100 and TF-140 (manufactured by Toda Kogyo Co., Ltd.), etc. can be cited. It is of course possible to use the abrasives of the present invention according to an intended purpose by changing the type, amount and combination thereof. These abrasives can be dispersed beforehand in a binder and then added to a magnetic coating solution.

Furthermore, additives having a lubricating effect, an antistatic effect, a dispersing effect, a plasticizing effect, etc. can be used in the present invention. For example, molybdenum disulfide, tungsten graphite disulfide, boron nitride, graphite fluoride, silicone oil, silicones having a polar group, fatty acid-modified silicones, fluorine-containing silicones, fluorine-containing alcohols, fluorine-containing esters, polyolefins, polyglycols, alkylphosphoric esters and alkali metal salts thereof, alkylsulfuric esters and alkali metal salts thereof, polyphenyl ethers, fluorine-containing alkylsulfuric esters and alkali metal salts thereof, monobasic fatty acids having 10 to 24 carbons (which can contain an unsaturated bond and be branched) and metal salts thereof (Li, Na, K, Cu, etc.), mono-, di-, tri-, tetra-, penta- and hexa-hydric alcohols having 12 to 22 carbons (which can contain an unsaturated bond and be branched), alkoxyalcohols havign 12 to 22 carbons, monofatty acid esters, difatty acid esters and trifatty acid esters obtained from monobasic fatty acids having 10 to 24 carbons (which can contain an unsaturated bond and be branched) and mono-, di-, tri-, tetra-, penta- and hexa-hydric alcohols having 2 to 12 carbons (which can contain an unsaturated bond and be branched), fatty acid esters of monoalkyl ethers of alkylene oxide polymers, fatty acid amides having 8 to 22 carbons, aliphatic amines having 8 to 22 carbons, etc. Specific examples thereof include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. Furthermore, nonionic surfactants such as alkylene oxide series, glycerin series, glycidol series and alkylphenol ethylene oxide adducts, cationic surfactants such as cyclic amines, ester amides, quaternary ammonium salts, hydantoin derivatives, heterocycles, and phosphonium and sulfonium compounds, anionic surfactants containing an acidic group such as carboxylic acids, sulfonic acids, phosphoric acids, sulfate esters, and phosphate esters, and amphoteric surfactants such as amino acids, aminosulfonic acids, sulfate or phosphate esters of aminoalcohols and alkyl betaine types can be used. Details of these surfactants are described in 'Kaimen Kasseizai Binran' (Surfactant Handbook) published by Sangyo Tosho K.K. These lubricants, antistatic agents, surfactants, etc. do not always need to be 100 wt % pure and can contain, in addition to the main component, impurities such as isomers, unreacted substances, by-products, decomposition products and oxides in an amount of 30 wt % or less, and more preferably 10 wt % or less.

The type and amount of lubricant and surfactant used in the present invention can be appropriately selected. For example, fatty acids having a different melting point from each other are combined so as to control migration to the surface, esters having a different boiling point and polarity are combined so as to control migration to the surface, and the amount of surfactant is adjusted so as to improve the coating stability. These examples are of course not cited to limit the scope of the present invention.

All or part of the additives used in the present invention can be added in any step of the process for producing a magnetic coating solution, for example, they can be mixed with ferromagnetic metal particles before a kneading step, they can be added in a kneading step where the ferromagnetic metal particles, a binder and a solvent are kneaded, they can be added in a dispersing step, they can be added after dispersing, or added immediately before coating. According to an intended purpose, part or all of the additives can be coated by simultaneous or sequential coating after the magnetic layer is coated so as to accomplish the purpose. The lubricants can also be coated on the surface of the magnetic layer according to the intended purpose after calendering or slitting.

Examples of commercially available lubricants include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acids, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (all produced by Nippon Oil & Fats Co., Ltd.), oleic acid (produced by Kanto Kagaku K.K.), FAL-205, FAL-123 and Pionin E-818 (both produced by Takemoto Yushi K.K.), Enujorubu LO, Enujorubu IPM, and Sansosyzer E4030 (all produced by New Japan Chemical Co., Ltd.), TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (all produced by Shin-Etsu Chemical Industry Co., Ltd.), Armide P, Armide C, and Armoslip CP (all produced by Lion Armour), Duomin TDO (produced by Lion Fat & Oil Co., Ltd.), BA-41G (produced by Nisshin Seiyu K.K.), Profan 2012E, Newpol PE 61, Ionet MS-400, Ionet MO-200, Ionet DL-200, Ionet DS-300, Ionet DS-1000 and Ionet DO-200 (all produced by Sanyo Chemical Industries Co., Ltd.), etc.

If an organic phosphorus compound having a molecular weight of 300 or less is used as an additive, the binding force and the amount of the ferromagnetic metal particles bound to the binder of the present invention are further increased so resulting in improved dispersibility and reduced head wear and decreasing the amount of binder that is not adsorbed on the ferromagnetic metal particles, and the durability of the magnetic recording medium can thus be enhanced outstandingly.

With regard to the organic phosphorus compounds, for example, compounds described in Japanese Patent Application Laid-open No.1-189025 such as monophenyl phosphate $C_6H_5OPO(OH)_2$, mono-n-butyl phosphate n-$C_4H_9OPO(OH)_2$, dibutyl phosphite $(C_4H_9O)_2P(OH)$, phenylphosphonic acid $C_6H_5PO(OH)_2$, etc. can be cited.

The structure in the thickness direction of the magnetic recording medium of the present invention usually comprises a non-magnetic support having a thickness of 1 to 100 $\mu$m, and preferably 4 to 12 $\mu$m, a magnetic layer usually having a thickness of 0.1 to 5 $\mu$m, and preferably 0.1 to 3 $\mu$m, and a backcoat layer usually having a thickness of 0.1 to 2 $\mu$m, and preferably 0.4 to 1 $\mu$m.

Furthermore, between the non-magnetic support and the magnetic layer can be formed an adhesive layer (which has a thickness of 0.01 to 2 $\mu$m, and preferably from 0.02 to 0.5 $\mu$m) for improving adhesion, or a non-magnetic layer principally containing a non-magnetic powder and a binder (which has a thickness of 0.1 to 4 $\mu$m, and preferably 0.4 to 2.5 $\mu$m). Known adhesive layers, non-magnetic layers and backcoat layers can be used in this case.

With regard to the non-magnetic support used in the present invention, known films such as polyethylene terephthalate, polyethylene naphthalate, polyamide, polyimide, polyamide imide, aromatic polyamide and polybenzimidazole can be used. In particular, a non-magnetic support using polyethylene terephthalate, polyethylene naphthalate or an aramid resin is preferred.

These non-magnetic supports can be subjected beforehand to a corona discharge treatment, a plasma treatment, a treatment for enhancing adhesion, a thermal treatment, a dust removal treatment, etc. In order to achieve the object of the present invention it is necessary for the surface roughness of the non-magnetic support to be 2 to 30 nm, preferably 5 to 25 nm, and more preferably 10 to 20 nm. In addition, it is preferable for these non-magnetic supports not only to have a small center-line average surface roughness but also to have no coarse projection having a height of 1 μm or more. Furthermore, the surface roughness can be freely controlled by the size and amount of a filler that is added, if necessary, to the non-magnetic support. With regard to examples of such a filler, either crystalline or amorphous oxides and carbonates of Al, Ca, Si, Ti, etc., and acrylic-based and melamine based organic fine powders, etc. can be cited. In order to simultaneously achieve running durability, it is preferable that the roughness of the side of the support on which a backcoat layer is coated is higher than that of the side of the support on which a magnetic layer is coated.

However, it does not matter whether the surface roughness of the side of the non-magnetic support on which a backcoat layer is coated is the same as or different from that of the side on which a magnetic layer is coated. If differentiating the roughness, a support having a dual structure can be used or a coated layer can be formed on one of the sides.

The F-5 value of the non-magnetic support used in the present invention is preferably 70 to 300 MPa in both the direction in which the tape runs (hereinafter, also called the tape running direction or tape longitudinal direction) and the tape width direction. The F-5 value in the tape longitudinal direction is normally higher than that in the tape width direction, but it is not limited by this if a particularly high strength is required in the width direction. In addition, the thermal shrinkage of the non-magnetic support in the tape longitudinal direction and in the tape width direction at 100° C. for 30 minutes is preferably 3% or less, and more preferably 1.5% or less, and the thermal shrinkage at 80° C. for 30 minutes is preferably 1% or less, and more preferably 0.5% or less. The tensile strength in both directions is preferably 50 to 1,000 N/mm$^2$ and the modulus of elasticity is preferably 1 to 20 GPa. In addition, the light transmittance at a wavelength of 900 nm in the present invention is preferably 30% or less, and more preferably 3% or less.

In order to achieve the object of the present invention, the magnetic recording medium is produced by known techniques, that is to say, preparing a magnetic coating solution, coating this on a non-magnetic support, orienting, drying and subjecting it to a surface smoothing treatment, and slitting it into a predetermined width.

The magnetic coating solution is prepared by kneading and dispersing a ferromagnetic powder, a binder, carbon black, an abrasive, an antistatic agent, a lubricant, etc., usually with a solvent. With regard to the solvent used in the kneading and dispersing, a solvent such as methyl ethyl ketone, toluene, butyl acetate or cyclohexanone, which are usually used for the preparation of a magnetic coating solution, can be used. The method used for kneading and dispersing is not particularly limited as long as it is one usually used for the preparation of a magnetic coating solution. The order in which the components are added can be set as appropriate. Moreover, it is also possible to pre-disperse part of the components in advance before addition, or alternatively the components are separately dispersed and then mixed with each other.

A normal kneader such as a two roll mill, a three roll mill, a ball mill, a sand grinder, an attritor, a high-speed impeller dispersing machine, a high-speed stone mill, a high-speed impact mill, a disper, a kneader, a high-speed mixer, a homogenizer or an ultrasonic dispersing machine can be used for the preparation of the magnetic coating solution. Details of techniques for kneading and dispersing are described in, for example, 'Paint Flow and Pigment Dispersion' by T. C. Patton (John Wiley & Sons, 1964) and Kogyo Zairyo Vol. 25, 37 (1977) by Shinichi Tanaka, et al. They are also described in U.S. Pat. Nos. 2,581,414 and 2,855,515. Also in the present invention, a magnetic coating solution can be prepared by kneading and dispersing in accordance with the methods described in the above-mentioned references.

The magnetic coating solution thus prepared is coated on the above-mentioned non-magnetic support. In this stage, the dry thickness of a magnetic layer is controlled so as to be preferably 0.05 to 10 μm, and more preferably 0.2 to 5.0 μm. In the case of a structure with multiple layers, a plurality of magnetic coating solutions are coated sequentially or simultaneously by multilayer coating. With regard to the coating machine for coating the above-mentioned magnetic coating solution, an air doctor coater, a blade coater, a rod coater, an extrusion coater, an air knife coater, a squeeze coater, an immersion coater, a reverse roll coater, a transfer roll coater, a gravure coater, a kiss coater, a cast coater, a spray coater, a spin coater, etc. can be employed. With respect to these coating machines, for example, "Latest Coating Technology" published by Sogo Gijutsu Center Co. Ltd., (May 31, 1983) can be referred to.

The coated layer obtained by so coating the magnetic coating solution is dried after subjecting the ferromagnetic powder contained in the layer coated with the magnetic coating solution to an orientation treatment with a magnetic field. The orientation treatment with a magnetic field is preferably carried out using a solenoid of at least 100×10$^{-3}$ T and a cobalt magnet of at least 200×10$^{-3}$ T disposed so that magnetic poles of the same type face each other. Furthermore, it is preferable to provide a step with some degree of drying before the orientation treatment so as to optimize the orientation after drying.

A backcoat layer (backing layer) can be formed on a side of the non-magnetic support on which a magnetic coating solution has not been coated. The backcoat layer is usually a layer that is formed by coating a backcoat coating solution, in which a binder and particulate components such as an abrasive and an antistatic agent are dispersed in an organic solvent, on the side of the non-magnetic support on which a magnetic coating solution has not been coated. Moreover, an adhesive layer can be provided on the sides of the non-magnetic support on which a magnetic coating solution and a backcoat layer coating solution are coated.

Coating of the backcoat layer is preferably carried out after coating and drying the magnetic coating solution, but it can be carried out before coating the magnetic coating solution or after surface smoothing, which will be described below.

After the coated layer so formed is dried, it is subjected to surface smoothing. The surface smoothing employs, for example, a super calender, etc. The smoothing can eliminate voids generated by removing a solvent during drying so improving the packing ratio of the ferromagnetic powder in the magnetic layer, and a magnetic recording medium having high electromagnetic conversion characteristics can thus be obtained. With regard to the calender roll, various types of metal roll and plastic rolls having heat-resistance such as those made of epoxy, polyimide, polyamide and polyimide amide are used. With regard to the calendering conditions, the temperature of the calender rolls is 60 to 150° C., preferably 70 to 130° C., and particularly preferably 80 to 110° C. The pressure thereon is 1,000 to 5,000 N/cm, preferably 2,000 to 4,500 N/cm, and particularly preferably 2,500 to 4,000 N/cm.

After the calendering, the sample is subjected to a thermal treatment. The thermal treatment can be carried out at a temperature ranging from 40 to 80° C. for 6 to 120 hours.

Thereafter, the sample is cut into an intended width using a cutting machine such as a slitter. Furthermore, after or before cutting, the surface of the magnetic layer can be subjected to a blade treatment using a sapphire knife, etc.

With regard to the magnetic characteristics of the magnetic recording medium of the present invention, when measuring in a magnetic field of 796 kA/m using a VSM (vibrating sample magnetometer), the squareness ratio in the tape longitudinal direction is at least 0.70, preferably at least 0.75, and more preferably at least 0.80. The squareness ratio in two directions that are perpendicular to the tape longitudinal direction is preferably at most 80% of that in the longitudinal direction. The SFD (switching field distribution) of the magnetic layer is preferably at most 0.7, and more preferably at most 0.6.

The coefficient of friction between SUS 420J and the surface of the magnetic layer and the reverse surface of the magnetic recording medium of the present invention is preferably 0.1 to 0.5, and more preferably 0.2 to 0.3. The surface resistivity is preferably $10^4$ to $10^{12}$ ohm/sq. The modulus of elasticity at 0.5% elongation of the magnetic layer is preferably 1 to 20 GPa in both the longitudinal and width directions. The tensile strength is preferably 10 to 300 MPa. The modulus of elasticity of the magnetic recording medium is preferably from 1 to 15 GPa in both the longitudinal and width directions. The residual elongation is preferably at most 0.5%. The thermal shrinkage at any temperature up to and including 100° C. is preferably at most 1%, more preferably at most 0.5%, yet more preferably at most 0.1%, and ideally 0%. The glass transition temperature (the temperature at which the loss modulus in a dynamic viscoelasticity measurement at 110 Hz is a maximum) of the magnetic layer is preferably 50° C. to 120° C. The loss modulus is preferably in the range of $1 \times 10^9$ to $8 \times 10^{10}$ $\mu N/cm^2$, and the loss tangent is preferably at most 0.2. When the loss tangent is too large, adhesion failure easily occurs.

The amount of residual solvent contained in the magnetic layer is preferably at most 100 mg/m$^2$, and more preferably at most 10 mg/m$^2$. The void ratio of the magnetic layer is preferably at most 40 vol %, and more preferably at most 30 vol %. Although a lower void ratio is preferred for attaining a higher output, in some cases it is better to maintain a certain level of void ratio according to an intended purpose. For example, in the case of a magnetic recording medium for recording data in which repetitive use is considered to be important, a higher void ratio often gives better running durability.

The magnetic recording medium of the present invention has at least one magnetic layer, but it is possible for it to have a multilayered structure according to an intended purpose. It is also possible to form a non-magnetic layer containing at least a non-magnetic powder and a binder between the magnetic layer and the non-magnetic support. It can easily be expected that various types of physical characteristic can be made different from each other among the layers. For example, the magnetic layer can be made to have a high elastic modulus to improve the running durability while the elastic modulus of a non-magnetic layer can be made lower than that of the magnetic layer so improving contact between a head and the magnetic recording medium.

EXAMPLES

Examples of the present invention will be explained below, but the present invention is not limited by the following examples. It should be noted that the designation "parts" in the examples means "parts by weight".

Example 1
Magnetic Coating Solution 1

100 parts of ferromagnetic metal particles (average major axis length: 0.13 $\mu$m, specific surface area: 49 m$^2$/g, axial ratio: 8, Co/Fe=7 atom%, Al/(Fe+Co)=11 atom%, Hc=131.3 kA/m, crystallite size: 17 nm) was ground in an open kneader for 10 minutes. Next, the following components were added to the kneader and then kneaded for 60 minutes.

| | |
|---|---|
| Vinyl chloride based resin (MR-110 manufactured by Nippon Zeon Co., Ltd.) | 9.5 parts |
| Polyurethane (UR-8200 manufactured by Toyobo Co., Ltd.) | 5 parts (solid portion) |
| Methyl ethyl ketone/Cyclohexanone = 1/1 | 40 parts |

The following components were then added to the mixture and dispersed in a sand mill for 120 minutes.

| | |
|---|---|
| α-Al$_2$O$_3$ (average particle size 0.15 $\mu$m) | 15 parts |
| Carbon black A (average particle size 63 nm) | 1 part |
| Methyl ethyl ketone/Cyclohexanone = 1/1 | 200 parts |

Furthermore, the following components were added to the sand mill and mixed while stirring for 20 minutes.

| | |
|---|---|
| Polyisocyanate (Coronate 3041 manufactured by Nippon Polyurethane Industry Co., Ltd.) | 4 parts (solid portion) |
| Stearic acid | 1 part |
| 2-Ethylhexyl stearate | 1 part |
| Stearamide | 0.2 parts |
| Toluene | 50 parts |

The mixture was then filtered using a filter having an average pore size of 1 $\mu$m to give magnetic coating solution 1.

| Composition of Backcoat solution 1 | |
|---|---|
| Carbon black B (particle size 18 nm) | 100 parts |
| Nitrocellulose (HIG 1/2 manufactured by Asahi Chemical Co., Ltd.) | 60 parts |
| Polyurethane (N-2301 manufactured by Nippon Polyurethane Co., Ltd.) | 60 parts |
| Polyisocyanate (Coronate L manufactured by Nippon Polyurethane Industry Co., Ltd.) | 20 parts |
| Methyl ethyl ketone | 1,000 parts |
| Toluene | 1,000 parts |

Production of Magnetic Tape of Example 1

The magnetic coating solution 1 so obtained was coated on the surface of a PET support having a thickness of 10 μm so as to have a dry coat thickness of 3 μm using an extrusion type coating head and subjected to magnetic field orientation using a magnetic field of $300 \times 10^{-3}$ T before the magnetic coating solution had dried. The backcoat solution 1 was then coated and dried so as to have a dry coat thickness of 0.5 μm. Subsequently, the sample was subjected to five stage calendering using a combination of metal rolls and heat-resistant plastic rolls (speed 100 m/min., line pressure 3,000 N/cm, temperature 80° C.).

The sample was then slit to a width of ½ inch at a speed of 200 m/min. to give a video tape.

The Ra of the surface of the magnetic layer of the magnetic tape so obtained was 4.2 nm, the steel ball wear at 23° C. and 70% RH was $2.7 \times 10^{-5}$ mm$^3$, the surface C/Fe ratio measured by Auger electron spectroscopy was 65, and the coefficient of friction between the surface of the magnetic layer and an SUS rod (SUS 420J) having a roughness of 8 to 10 nm was 0.25. In the present examples, SUS rods made from the same material, SUS 420J, as in Example 1 were used in the measurement of the coefficient of friction in Examples 2 to 5 and Comparative Examples 1 to 6.

Comparative Example 1

A magnetic tape was produced in the same manner as in Example 1 except that carbon black C (particle size 21 nm) was used instead of the carbon black A (particle size 63 nm) used in the magnetic coating solution of Example 1. The Ra of the surface of the magnetic layer was 3.9 nm, the steel ball wear at 23° C. and 70% RH was $2.4 \times 10^{-5}$ mm$^3$, the surface C/Fe ratio measured by Auger electron spectroscopy was 71 and the coefficient of friction between the surface of the magnetic layer and an SUS rod having a roughness of 8 to 10 nm was 0.34.

Comparative Example 2

A magnetic tape was produced in the same manner as in Example 1 except that the amount of carbon black A (particle size 63 nm) used in the magnetic coating solution of Example 1 was changed from 1 part by weight to 3 parts by weight. The Ra of the surface of the magnetic layer was 4.6 nm, the steel ball wear at 23° C. and 70% RH was $3.2 \times 10^{-5}$ mm$^3$, the surface C/Fe ratio measured by Auger electron spectroscopy was 75 and the coefficient of friction between the surface of the magnetic layer and an SUS rod having a roughness of 8 to 10 nm was 0.16.

Example 2

Magnetic Coating Solution 2

100 parts of ferromagnetic metal particles (average major axis length: 0.11 μm, specific surface area: 52 m$^2$/g, axial ratio: 6, Co/Fe=3 atom %, Al/(Fe+Co)=8 atom %, Hc=131.3 kA/m, crystallite size: 16 nm) was ground in an open kneader for 10 minutes. Next, the following components were added to the kneader and then kneaded for 60 minutes.

| | |
|---|---|
| Vinyl chloride based resin (MR-110 manufactured by Nippon Zeon Co., Ltd.) | 11 parts |
| Polyurethane (UR-8300 manufactured by Toyobo Co., Ltd.) | 5 parts (solid portion) |
| Methyl ethyl ketone/Cyclohexanone = 1/1 | 40 parts |

The following components were then added to the mixture and dispersed in a sand mill for 120 minutes.

| | |
|---|---|
| α-Al$_2$O$_3$ (average particle size 0.17 μm) | 10 parts |
| Carbon black D (average particle size 90 nm) | 1.3 parts |
| Methyl ethyl ketone/Cyclohexanone = 1/1 | 200 parts |

Furthermore, the following components were added to the sand mill and mixed while stirring for 20 minutes.

| | |
|---|---|
| Polyisocyanate (Coronate 3041 manufactured by Nippon Polyurethane Industry Co., Ltd.) | 5 parts (solid portion) |
| Stearic acid | 1 part |
| 2-Hexyldecyl stearate | 0.8 parts |
| Stearamide | 0.2 parts |
| Toluene | 50 parts |

The mixture was then filtered using a filter having an average pore size of 1 μm to give magnetic coating solution 2.

Production of Magnetic Tape of Example 2

The magnetic coating solution 2 so obtained was coated on the surface of a PET support having a thickness of 10.5 μm so as to have a dry coat thickness of 2.5 μm using an extrusion type coating head and subjected to magnetic field orientation using a magnetic field of $300 \times 10^{-3}$ T before the magnetic coating solution had dried. The backcoat solution 1 was then coated and dried so as to have a dry coat thickness of 0.5 μm. Subsequently, the sample was subjected to seven stage calendering using a combination of metal rolls and heat-resistant plastic rolls (speed 150 m/min., line pressure 3,300 N/cm, temperature 90° C.).

The sample was then slit to a width of ½ inch at a speed of 200 m/min. to give a video tape. The Ra of the surface of the magnetic layer of the magnetic tape so obtained was 5.6 nm, the steel ball wear at 23° C. and 70% RH was $3.5 \times 10^{-5}$ mm$^3$, the surface C/Fe ratio measured by Auger electron spectroscopy was 97, and the coefficient of friction between the surface of the magnetic layer and an SUS rod having a roughness of 8 to 10 nm was 0.29.

Example 3

A magnetic tape was produced in the same manner as in Example 2 except that the thickness of the magnetic layer was reduced to 1.5 μm and the thickness of the support was 11.5 μm. The Ra of the surface of the magnetic layer was 5.9 nm, the steel ball wear at 23° C. and 70% RH was $3.8 \times 10^{-5}$ mm$^3$, the surface C/Fe ratio measured by Auger electron spectroscopy was 57 and the coefficient of friction between the surface of the magnetic layer and an SUS rod having a roughness of 8 to 10 nm was 0.21.

Comparative Example 3

A magnetic tape was produced in the same manner as in Example 2 except that butyl stearate was used instead of 2-hexyldecyl stearate in the magnetic coating solution and stearic acid was not used. The Ra of the surface of the magnetic layer was 5.5 nm, the steel ball wear at 23° C. and 70% RH was $3.7 \times 10^{-5}$ mm$^3$, the surface C/Fe ratio measured by Auger electron spectroscopy was 45 and the coefficient of friction between the surface of the magnetic layer and an SUS rod having a roughness of 8 to 10 nm was 0.27.

Comparative Example 4

A magnetic tape was produced in the same manner as in Example 2 except that the amount of 2-hexyldecyl stearate in the magnetic coating solution was changed from 0.8 parts by weight to 1.5 parts by weight and the amount of stearamide was changed from 0.2 parts by weight to 0.4 parts by weight. The Ra of the surface of the magnetic layer was 5.4 nm, the steel ball wear at 23° C. and 70% RH was $3.3 \times 10^{-5}$ mm$^3$, the surface C/Fe ratio measured by Auger electron spectroscopy was 45 and the coefficient of friction between the surface of the magnetic layer and an SUS rod having a roughness of 8 to 10 nm was 0.24.

Example 4
Magnetic Coating Solution 4

100 parts of ferromagnetic metal particles (average major axis length: 0.09 μm, specific surface area: 55 m$^2$/g, axial ratio: 6, Co/Fe=22 atom%, Al/(Fe+Co)=10 atom%, Hc=136.1 kA/m, crystallite size: 14 nm) was ground in an open kneader for 10 minutes. Next, the following components were added to the kneader and then kneaded for 60 minutes.

| | |
|---|---|
| Vinyl chloride based resin (MR-110 manufactured by Nippon Zeon Co., Ltd.) | 12 parts |
| Polyurethane (UR-8300 manufactured by Toyobo Co., Ltd.) | 5 parts (solid portion) |
| Methyl ethyl ketone/Cyclohexanone = 1/2 | 40 parts |

The following components were then added to the mixture and dispersed in a sand mill for 120 minutes.

| | |
|---|---|
| α-Al$_2$O$_3$ (average particle size 0.13 μm) | 18 parts |
| Carbon black A (average particle size 63 nm) | 1 part |
| Methyl ethyl ketone/Cyclohexanone = 1/1 | 200 parts |

Furthermore, the following components were added to the sand mill and mixed while stirring for 20 minutes.

| | |
|---|---|
| Polyisocyanate (Coronate 3041 manufactured by Nippon Polyurethane Industry Co., Ltd.) | 5 parts (solid portion) |
| Stearic acid | 1 part |
| 2-Ethylhexyl stearate | 1 part |
| Stearamide | 0.2 parts |
| Toluene | 50 parts |

The mixture was then filtered using a filter having an average pore size of 1 μm to give magnetic coating solution 4.

Production of Magnetic Tape of Example 4

The magnetic coating solution 4 so obtained was coated on the surface of a PET support having a thickness of 11 μm so as to have a dry coat thickness of 2 μm using an extrusion type coating head and subjected to magnetic field orientation using a magnetic field of $300 \times 10^{-3}$ T before the magnetic coating solution had dried. The backcoat solution 1 was then coated and dried so as to have a dry coat thickness of 0.5 μm. Subsequently, the sample was subjected to five stage calendering using a combination of metal rolls (speed 200 m/min., line pressure 4,000 N/cm, temperature 80° C.).

The sample was then slit to a width of ½ inch at 200 m/min. to give a video tape.

The Ra of the surface of the magnetic layer of the magnetic tape so obtained was 3.2 nm, the steel ball wear at 23° C. and 70% RH was $3.8 \times 10^{-5}$ mm$^3$, the surface C/Fe ratio measured by Auger electron spectroscopy was 54, and the coefficient of friction between the surface of the magnetic layer and an SUS rod having a roughness of 8 to 10 nm was 0.25.

Example 5
Magnetic Coating Solution 5

100 parts of ferromagnetic metal particles (average major axis length: 0.09 μm, specific surface area: 55 m$^2$/g, axial ratio: 6, Co/Fe=22 atom %, Al/(Fe+Co)=10 atom%, Hc=136.1 kA/m, crystallite size: 14 nm) was ground in an open kneader for 10 minutes. Next, the following components were added to the kneader and then kneaded for 60 minutes.

| | |
|---|---|
| Vinyl chloride based resin (MR-110 manufactured by Nippon Zeon Co., Ltd.) | 12 parts |
| Polyurethane (UR-8300 manufactured by Toyobo Co., Ltd.) | 5 parts (solid portion) |
| Methyl ethyl ketone/Cyclohexanone = 1/2 | 40 parts |

The following components were then added to the mixture and dispersed in a sand mill for 120 minutes.

| | |
|---|---|
| α-Al$_2$O$_3$ (average particle size 0.20 μm) | 9 parts |
| Carbon black A (average particle size 80 nm) | 0.5 parts |
| Methyl ethyl ketone/Cyclohexanone = 1/1 | 200 parts |

Furthermore, the following components were added to the sand mill and mixed while stirring for 20 minutes.

| | |
|---|---|
| Polyisocyanate (Coronate 3041 manufactured by Nippon Polyurethane Industry Co., Ltd.) | 5 parts (solid portion) |
| Stearic acid | 1 part |
| 2-Ethylhexyl stearate | 1 part |
| Stearamide | 0.2 parts |
| Toluene | 50 parts |

The mixture was then filtered using a filter having an average pore size of 1 μm to give magnetic coating solution 5.

Production of Magnetic Tape of Example 5

The magnetic coating solution 5 so obtained was coated on the surface of a PET support having a thickness of 11 μm so as to have a dry coat thickness of 2 μm using an extrusion type coating head and subjected to magnetic field orientation using a magnetic field of $300 \times 10^{-3}$ T before the magnetic coating solution had dried. The backcoat solution 1 was then coated and dried so as to have a dry coat thickness of 0.5 μm. Subsequently, the sample was subjected to five stage calendering using a combination of metal rolls (speed 200 m/min., line pressure 4,000 N/cm, temperature 80° C.).

The sample was then slit to a width of ½ inch at 200 m/min. to give a video tape.

The Ra of the surface of the magnetic layer of the magnetic tape so obtained was 3.3 nm, the steel ball wear at 23° C. and 70% RH was $2.2 \times 10^{-5}$ mm$^3$, the surface C/Fe ratio measured by Auger electron spectroscopy was 88, and the coefficient of friction between the surface of the magnetic layer and an SUS rod having a roughness of 8 to 10 nm was 0.29.

Comparative Example 5

A magnetic tape was produced in the same manner as in Example 5 except that the amount of α-Al$_2$O$_3$ (average particle size 0.20 μm) in the magnetic coating solution was changed from 9 parts to 20 parts. The Ra of the surface of the magnetic layer was 3.6 nm, the steel ball wear at 23° C. and 70% RH was $4.4 \times 10^{-5}$ mm$^3$, the surface C/Fe ratio measured by Auger electron spectroscopy was 79 and the coefficient of friction between the surface of the magnetic layer and an SUS rod having a roughness of 8 to 10 nm was 0.27

Comparative Example 6

A magnetic tape was produced in the same manner as in Example 5 except that 5 parts of α-Al$_2$O$_3$ (average particle size 0.15 μm) was used instead of 9 parts of α-Al$_2$O$_3$ (average particle size 0.20 μm) in the magnetic coating solution. The Ra of the surface of the magnetic layer was 3.3 nm, the steel ball wear at 23° C. and 70% RH was $1.7 \times 10^{-5}$ mm$^3$, the surface C/Fe ratio measured by Auger electron spectroscopy was 71 and the coefficient of friction between the surface of the magnetic layer and an SUS rod having a roughness of 8 to 10 nm was 0.25.

Evaluation Method

The magnetic tapes so obtained were installed in a D-3 system M cassette half at a length of 94 minutes, and the following tests were carried out using an AJ-D350 VTR (middle cylinder rotary type) manufactured by Matsushita Electronic Industrial Co., Ltd. The VTR was run at 20° C. and 50%.

Video Playback Output

A signal at 33 MHz was recorded, and the playback output when playing back this signal was measured using a spectrum analyzer. The output of a reference tape (D-3001, manufactured by Fuji Photo Film Co., Ltd.) was defined as 0 dB.

Head Wear

After recording a signal at 33 MHz for 90 minutes on a 94 minute tape and rewinding, it was played back continuously 50 times. The wear was obtained by measuring the head height before and after running.

Head Contamination (1)

After recording a signal at 33 MHz for 90 minutes on a 94 minute tape and rewinding, it was played back continuously 50 times. The state of contamination of the head after running was evaluated using the criteria below.

A: No contamination
B: Slightly contaminated
C: Fairly contaminated
D: Head gap contaminated Running at low speed A 33 MHz signal was recorded for 2 minutes on a 94 minute tape. After it was rewound, the 2 minute length was played back repeatedly 1,000 times at ¼ speed. The state of contamination of the head after running was evaluated using the criteria below.

A: No contamination
B: Slightly contaminated
C: Fairly contaminated
D: Head gap contaminated Rewound state after high speed REW After the whole length of the 94 minute tape was run FF at 50× speed, it was run in REW at the same 50× speed. The rewound state of the tape after the REW was evaluated as follows.

A: No tape protruding from the rewound surface
B: 1 to 10 pieces protruding
C: more than 10 pieces protruding The results are given in Table 1. The magnetic tapes of the examples obtained according to the present invention had a high playback output, less head wear, reduced head contamination, good performance when running at low speed and an excellent rewound state after high speed REW.

TABLE 1

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Ra (nm) | 4.2 | 5.6 | 5.9 | 3.2 | 3.3 | 3.9 | 4.6 | 5.5 | 5.4 | 3.6 | 3.3 |
| Steel ball wear ($\times 10^{-5}$ mm$^3$) | 2.7 | 3.5 | 3.8 | 3.8 | 2.2 | 2.4 | 3.2 | 3.7 | 3.3 | 4.5 | 1.7 |
| Surface C/Fe ratio | 65 | 97 | 57 | 54 | 88 | 71 | 75 | 45 | 120 | 79 | 71 |
| Coefficient of friction | 0.25 | 0.22 | 0.21 | 0.25 | 0.29 | 0.34 | 0.16 | 0.27 | 0.24 | 0.27 | 0.25 |
| Playback output (dB) | +1.2 | +1.3 | +0.7 | +1.7 | +1.5 | +1.4 | +1.0 | +1.2 | +1.1 | +0.5 | +1.7 |
| Head wear (μm/150 H) | 0.8 | 1.0 | 1.2 | 0.6 | 0.9 | 0.9 | 0.7 | 3.2 | 1.1 | 3.3 | 0.5 |
| Head contamination | A | A | B | A | B | C | A | C | D[*2] | C | D[*3] |
| Low speed running | A | B | A | B | A | D[*1] | A | B | C | C | A |

TABLE 1-continued

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Rewound state after high speed REW | A | A | A | A | A | A | C | A | A | A | A |

*[1]On the 75th pass running stopped.
*[2]Clogging
*[3]12th winding clogging

Although the present invention has been fully described by way of preferred embodiments thereof with reference to the accompanying drawing, various changes and modifications will be apparent to those having skill in the field. Therefore, unless these changes and modifications otherwise depart from the scope of the present invention, they should be construed as being included therein.

What is claimed is:

1. A magnetic recording medium comprising a non-magnetic support and at least one magnetic layer comprising ferromagnetic metal particles principally containing iron, having a spindle shape and having an average major axis length of 0.15 μm or less, and a binder resin, and optionally further comprising, between the support and the magnetic layer, at least one adhesive layer or at least one non-magnetic layer principally containing a non-magnetic inorganic powder and a binder, and wherein center line average surface roughness Ra of the magnetic layer surface is 2 to 6 nm, said recording medium having the following properties:

steel ball wear at 23° C. and 70% RH is $2 \times 10^{-5}$ to $4 \times 10^{-5}$ mm$^3$;

surface C/Fe ratio measured by Auger electron spectroscopy is 50 to 100; and coefficient of friction between the magnetic layer surface and an SUS rod having a roughness of 8 to 10 nm is 0.2 to 0.3.

2. The magnetic recording medium according to claim 1 wherein the average major axis length of the ferromagnetic metal particles contained in the magnetic layer is in the range from 0.05 to 0.15 μm.

3. The magnetic recording medium according to claim 1 wherein the average major axis length of the ferromagnetic metal particles contained in the magnetic layer is in the range from 0.05 to 0.12 μm.

4. The magnetic recording medium according to claim 1 wherein the specific surface area of the ferromagnetic metal particles contained in the magnetic layer is in the range from 40 to 60 m$^2$/g.

5. The magnetic recording medium according to claim 1 wherein the ferromagnetic metal particles contained in the magnetic layer principally contain Fe and include at least Al and Co; Al/(Fe+Co)=5 to 15 atom % and Co/Fe=1 to 25 atom %.

6. The magnetic recording medium according to claim 1 wherein the crystalline size of the ferromagnetic metal particles is 13 to 18 nm.

7. The magnetic recording medium according to claim 1 wherein said binder resin comprises a vinyl chloride based resin, a polyurethane and a polyisocyanate.

8. The magnetic recording medium according to claim 7 wherein the vinyl chloride based resin is 5 to 20 wt %, the polyurethane resin is 2 to 15 wt %, the polyisocyanate is 2 to 20 wt %, and the total amount of the binder resin is 10 to 30 wt % relative to the ferromagnetic particles.

9. The magnetic recording medium according to claim 1 wherein the magnetic layer contains an abrasive having a Mohs hardness of at least 6.

10. The magnetic recording medium according to claim 9 wherein the abrasive is α-alumina having an a component proportion of at least 90%.

11. The magnetic recording medium according to claim 9 wherein the abrasive has an average particle size of 0.01 to 20.0 μm.

12. The magnetic recording medium according to claim 1, further comprising a backcoat layer located on the side of the non-magnetic support opposite the magnetic layer, wherein the thickness of the non-magnetic support is 1 to 100 μm, the thickness of the magnetic layer is 0.1 to 5 μm, and the thickness of the backcoat layer is 0.1 to 2 μm.

13. The magnetic recording medium according to claim 12 wherein the thickness of the non-magnetic support is 4 to 12 μm, the thickness of the magnetic layer is 0.1 to 3 μm, and the thickness of the backcoat layer is 0.4 to 1 μm.

14. The magnetic recording medium according to claim 1 wherein a non-magnetic layer mainly containing a non-magnetic inorganic powder and a binder is provided between the non-magnetic support and the magnetic layer.

15. The magnetic recording medium according to claim 14 wherein the thickness of the non-magnetic layer is 0.1 to 4 μm.

16. The magnetic recording medium according to claim 14 wherein the thickness of the non-magnetic layer is 0.4 to 2.5 μm.

17. The magnetic recording medium according to claim 1 wherein an axis ratio of the ferromagnetic metal particles is in the range from 5 to 10.

18. A magnetic recording medium for use in a magnetic recording and playback drive of a middle cylinder rotary type comprising:

a non-magnetic support; and at least one magnetic layer formed by coating ferromagnetic metal particles principally containing iron, having a spindle shape and having an average major axis length of 0.15 μm or less, and a binder resin directly on the non-magnetic support or via at least one adhesive layer or at least one non-magnetic layer principally containing a non-magnetic inorganic powder and a binder;

center line average surface roughness Ra of the magnetic layer surface being 2 to 6 nm;

steel ball wear at 23° C. and 70% RH being $2 \times 10^{-5}$ to $4 \times 10^{-5}$ mm$^3$;

surface C/Fe ratio measured by Auger electron spectroscopy being 50 to 100; and coefficient of friction between the magnetic layer surface and an SUS rod having a roughness of 8 to 10 nm being 0.2 to 0.3.

* * * * *